United States Patent [19]
McEwen et al.

[11] Patent Number: 5,180,912
[45] Date of Patent: Jan. 19, 1993

[54] DISPLAY SYSTEM WITH MEANS FOR VARIABLY DEFLECTING AN ARRAY OF OPTICAL EMITTERS

[75] Inventors: Robert K. McEwen; Alan D. MacLeod, both of Essex, United Kingdom

[73] Assignee: GEC-Marconi Limited, Stanmore, United Kingdom

[21] Appl. No.: 748,080

[22] Filed: Aug. 21, 1991

[30] Foreign Application Priority Data

Sep. 5, 1990 [GB] United Kingdom ............... 9019336

[51] Int. Cl.⁵ ................................................ H01J 3/14
[52] U.S. Cl. ..................................... 250/234; 250/235
[58] Field of Search ................ 250/234, 235, 236; 340/755; 358/113, 208; 359/216, 217

[56] References Cited

U.S. PATENT DOCUMENTS

| | | | |
|---|---|---|---|
| 3,828,124 | 8/1974 | Baum | 359/216 |
| 4,227,210 | 10/1980 | Nixon | 358/113 |
| 4,340,888 | 7/1982 | Seroskie | 340/755 |
| 4,650,997 | 3/1987 | Yawn et al. | 250/236 |
| 4,934,773 | 6/1990 | Becker | 340/755 |
| 5,046,796 | 9/1991 | Andoh et al. | 359/216 |

FOREIGN PATENT DOCUMENTS 2152781A 6/1982 United Kingdom.
2119196A 12/1982 United Kingdom.

Primary Examiner—Edward P. Westin
Assistant Examiner—T. Davenport
Attorney, Agent, or Firm—Lowe, Price, LeBlanc & Becker

[57] ABSTRACT

An imager comprises a lens 31 focusing radiation onto a sensor array 32, and a chopper comprising sectors which refract radiation in different directions such that an image is microscanned upon the sensor array 32. The chopper 4 is driven by motor 34 which also drives a polygon 37. The sensor array is read line by line and displayed on a linear array of LEDs 36 which appear to an observer observing through eye piece 38 as a complete two dimensional image as seen by the sensor ray 32. This is due to the persistence vision. Each facet of the polygon 37 is cut such that it compensates for the offset produced by the microscan.

19 Claims, 3 Drawing Sheets

DISPLAY SYSTEM WITH MEANS FOR VARIABLY DEFLECTING AN ARRAY OF OPTICAL EMITTERS

BACKGROUND OF THE INVENTION

1. Field of the Invention

This invention relates to an imager using Focal Plane Arrays (FPAs), in particular imaging in the Infra Red (IR) wavebands using such devices.

2. Description of the Prior Art

IR imaging systems are becoming more important in many fields now, in particular military, security and search and rescue applications. Early IR imagers employed a small number of detector elements, across which was scanned an IR image of the scene via a system of mirrors and polygons. More recent developments include imagers based on 2 dimensional arrays of detector elements, so called staring arrays, which require no scanning to produce a useful image of the scene. The dwell time available for each detector element in such systems is considerably increased over earlier scanner systems resulting in significantly improved system performance being achievable from comparable detector materials. The IR system designer can choose whether to exploit this increase in performance or use a lower performance detector material to achieve a similar sensitivity as in the earlier scanner systems. High system performance is typified by imagers based on arrays of Cadmium Mercury Telluride cooled to liquid nitrogen temperatures, whilst conventional levels of performance are achieved by imagers based on Schottky barrier arrays and pyroelectric ceramics. These latter systems offer significant advantages in terms of cost and/or logistical support requirements (such as coolant supplies) over the high performance systems.

Unfortunately, several disadvantages of FPA imagers must be overcome to provide performance comparable with conventionally scanned imagers. Current FPAs are only available in limited pixel counts, typically 128×128 or 256×256 elements, which is insufficient to match the spatial resolution of the best scanned imager systems. Eventually, the development of suitable fabrication technologies will overcome this problem, resulting in large pixel densities.

At the present time however, staring focal plane array imagers require the image to be microscanned, or dithered, on the focal plane for full spatial resolution to be achieved from the system. The image formed must be constructed from interlacing several such microscanned fields to produce a composite frame of data before display. The general concept for a 2×2 microscan system is shown in FIG. 1. The image is moved through 4 positions A to D, 2 in each axis, and interrogated by the FPA at each position. The full frame of data E, comprising the suitably interlaced microscan fields, is then displayed to the observer with the full resolution of the system. Although FIG. 1 shows a 2×2 microscan approach, other relationships are possible, such as 2×1 in a diagonal axis, 2×3 and 3×3. The optimum number of fields used to produce the composite frame depends on several factors including the detector element size and shape, the elemental pitch, and the relative Modulation Transfer Functions (MTFs) of the other components, such as the optics, in the system.

An imager employing an improved microscanning technique, (which is the subject of a copending application having the same date of filing as the present application, Ser. No. 07/748,812) is disclosed in FIG. 2.

The imager 1, comprises a lens 2, a two dimensional sensor array 3, and chopper 4 driven by a motor 5. The chopper is shown in plan view in FIG. 3 and comprises a plurality of non transmissive regions 5 and transmissive regions 6 comprising refractive material angled so as to refract radiation in the directions indicated by arrows 7.

When the motor 5 of FIG. 2 is energised by battery 8 the chopper 4 rotates, and each line of the sensor array 3 is read out by the electronic circuit 9 as the leading edge 10 of each non transmissive region 5 passes over it.

Incident radiation on the imager is refracted in a different direction by each successive transmission region 6 of the chopper 4 thereby implementing microscan. Successive frames are interleaved digitially in a frame store within the electronic circuit 9, prior to display on the cathode ray tube 11. This results in several disadvantages of the overall system.

1. The system can be quite electronically complex and requires frame storage.

2. The system complexity results in inevitable system expense.

3. By interlacing the data in a frame store before subsequent display in a single frame, the temporal continuity of the imaging process is destroyed, resulting in a loss of the benefits of microscan when the image is moving. This is particularly so when the imager is panned, resulting in multiple images being produced each corresponding to the position of the image o the detector in each of the microscan fields. Since these are essentially uncorrelated due to the imager motion, extensive data manipulation would be required to overcome the problem.

4. In general such systems utilise a cathode ray tube (CRT) for the display of information to the user. Such displays, although commonly used, suffer from considerable disadvantages. In particular, the CRTs are manufactured using vacuum glass technology, and as such are particularly fragile unless steps are taken to ruggedise the tube. Also likely to suffer damage from vibration and shock are the delicate electrodes and phosphor screen coatings. Although ruggedised CRTs are available they are expensive and more bulky than their conventional equivalents. In addition, the power consumption of CRTs is usually in excess of one watt, and can run to several watts for the larger and/or ruggedised tubes, not including the requirements of the drive electronics. A further problem associated with CRT displays is that the electronic drive circuits rarely operate with the same scan sequences as the detector, resulting in the requirement for additional frame storage and data resequencing—if only at different timings— between the detection and display processes.

An image overcoming the need for a cathode ray tube to display an image (which is the subject of another copending application having the same date of filing as the present application, Ser. No. 07/748,212) is disclosed in FIG. 4.

The imager of FIG. 4 comprises a lens 20 focusing radiation onto a sensor array 21. In operation radiation incedent on the sensor array 21 is interrupted by a chopper 22, which is shown in greater detail in FIG. 5. The chopper is driven by motor 23, energised by battery 24, and is synchronised to an electronic circuit 25, which reads each frame of the sensor array 21 sequentially line by line, as each leading edge 26 of each chopper blade 27, passes over it. The electronic circuit 25 energises a linear array of LEDs 28 such that they are illuminated in dependence upon the radiation received by each corresponding element of the line being read from the sensor array 21. A reflective surface 29 of a polygon 30 driven by the motor 23, scans radiation from the array of LEDs such that, due to natural persistence of vision, an image apparently comprising a two dimensional array of LEDs depicting the image received by the sensor array 21, is seen by an operator.

The present invention arose from the realisation that the principles of the two inventions above described could be employed to provide an improved imager.

SUMMARY OF THE INVENTION

According to the present invention there is provided an imager comprising: a lens for focusing received radiation onto a two dimensional array of sensor elements; mechanical means for displacing an image incident on the array of sensor elements relative to the array to effect microscan; an array of optical elements which generate an output in dependence upon radiation incident on the sensor array; and means for variably deflecting radiation from the optical elements in synchronism with the means for effecting microscan. Preferably the radiation from the optical elements is deflected in opposite sense, and in proportion to the displacement of the image on the sensor elements.

By employing the invention each field produced by microscanning can be displaced directly on the observers field of view in real time without the requirement of complex interlacing electronics to produce the composite frame. The persistence of vision of the human eye and the ability of the eye/brain to track and follow targets in the field of view result in the automatic interlacing of the perceived image. Therefore the temporal consistency of the data is retained throughout the imaging chain thus ensuring the preservation of the benefits of microscan even when the image is moved as in panning the camera.

Advantageously the variably deflecting means comprises a polygon having reflective facets arranged to rotate about a central axis such that sequential optical outputs from the optical elements are scanned by the polygon.

It is therefore only necessary to provide a single line output display and use the multifaceted polygon to scan this display across the users eye using the natural persistence of vision to generate a two dimensional image from the one dimensional array.

Preferably mechanical means for displacing an image and means for deflecting radiation from the optical generating means are mechanically coupled thereby providing synchronisation by utilising a single drive mechanism.

Advantageously the facets of the polygon are profiled to produce a displacement of the sequential images generated by scanning the optical array, the displacement being in the opposite sense to the displacement due to microscanning prior to incedence on the sensor array. This enables compensation to be made for the offsetting by the microscan, providing a design of low technology which is easy and cheap to manufacture having relative low tolerances for an optical system. Furthermore because there is no need for a cathode ray tube power consumption of the entire microscan display system is minimal, making it ideally suitable for low power applications.

DETAILED DESCRIPTION OF THE PREFERRED EMBODIMENTS

Figure 1:
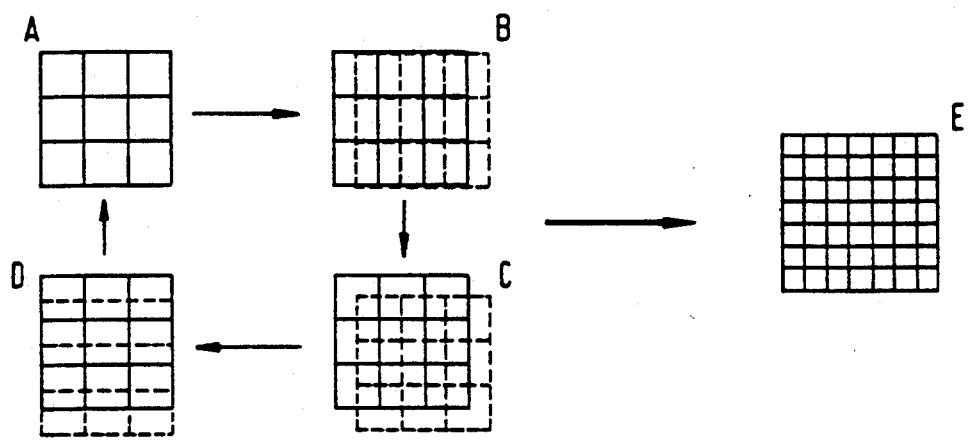
FIG. 1 is a schematic of the concept of a 2×2 microscan system.
Figure 2:
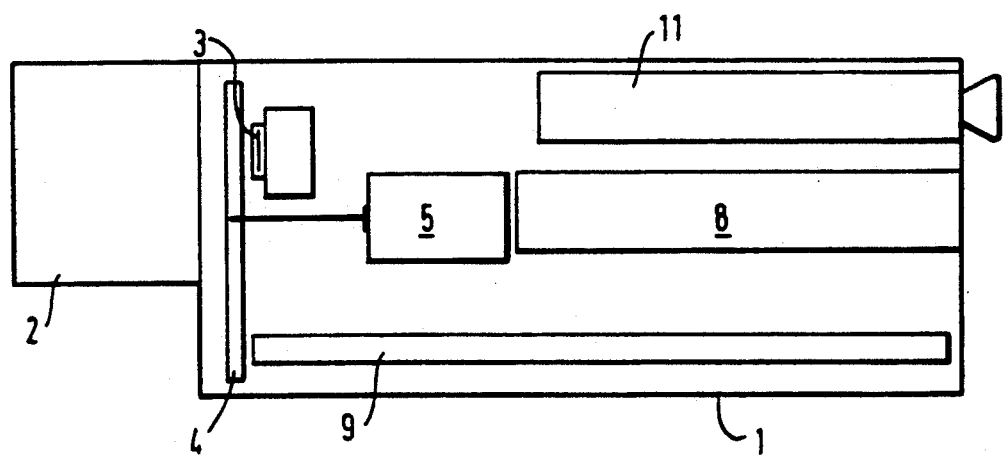
FIG. 2 is a schematic representation of an imager described in a related patent application.
Figure 3:
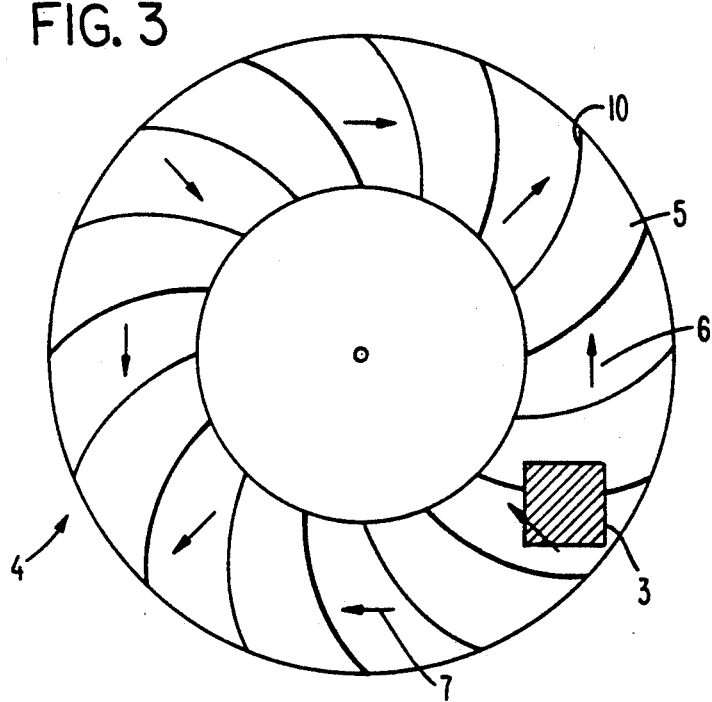
FIG. 3 is an illustration of the chopper of the system of FIG. 2.
Figure 4:
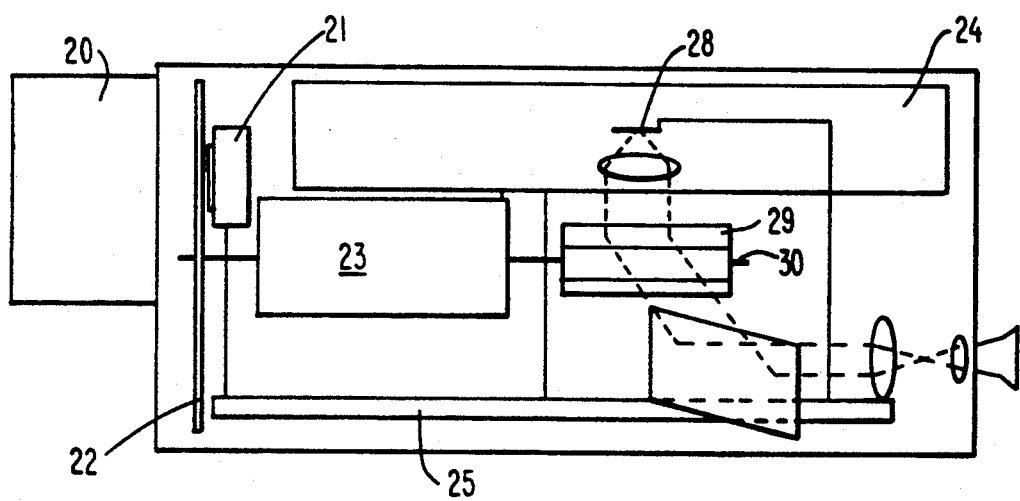
FIG. 4 is a schematic illustrating an imager described in a related patent application.
Figure 5:
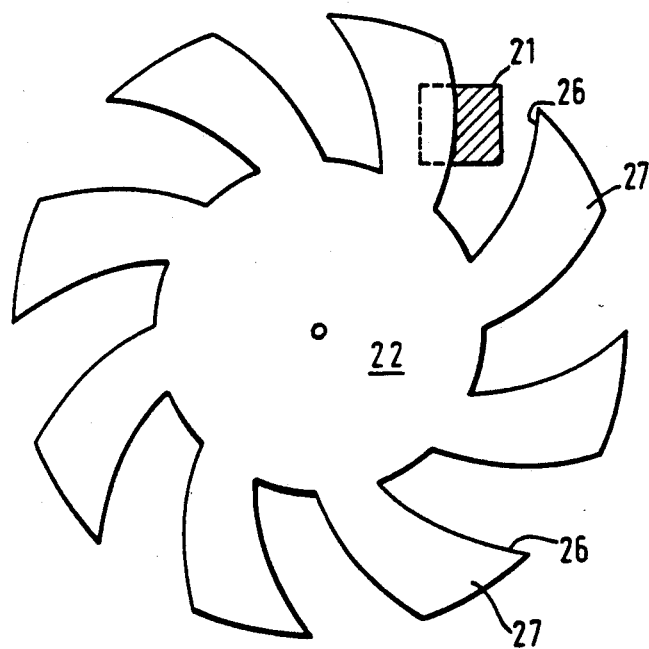
FIG. 5 is an illustration of the chopper of the imager of FIG. 4.
Figure 6:
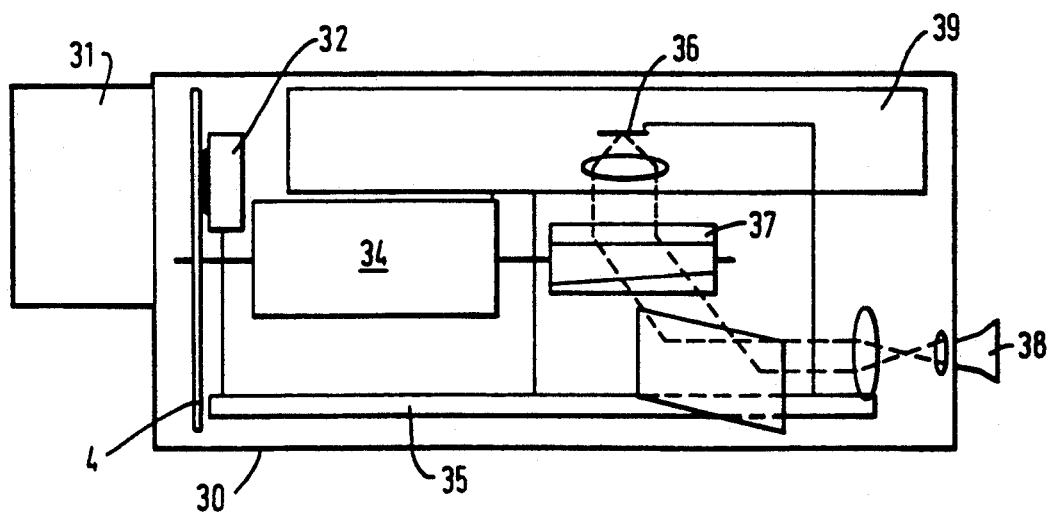
FIG. 6 is a schematic of an imager of an embodiment of this invention.

One embodiment of the invention will now be described by way of example only with reference to FIGS. 3 and 6 of the drawings, FIG. 6, schematically illustrating an imager employing the chopper 4 of FIG. 3.

The imager 30 of FIG. 6 comprises a lens 31, an array of pyroelectric sensing elements 32, a chopper 33 driven by motor 34, electronic circuit 35, an array of LEDs 36, a polygon 37, an eye piece 38 and a battery 39. The chopper, shown in FIG. 3, comprises a plurality of non-transmissive regions 5 and transmissive regions 6 comprising refracting material, each region refracting in the direction of the arrows 7.

In operation radiation is focused by the lens 31 on the pyroelectric array of sensing elements 32. This radiation is interrupted by chopper 4 which is rotated by motor 34. The motor is synchronised to the electric readout circuit 35 such that each line of the imager ray 32 is read out as the chopper edge 10 of chopper 4 obscures that line. The circuit 35 energises the array of LEDs 36 such they are illuminated in dependance upon the radiation received by each corresponding element of the line being read out. The motor 34 rotates the polygon 37 which reflects radiation from the LED 36 into an observers field of view. Rotation of the polygon causes successive line readouts displayed by the LED to appear in adjacent positions so that an observer viewing through the eye piece 38, due to persistence of vision, observes a complete frame.

The next frame is read line by line from the array of sensing elements 32. This has been refracted in a different direction by the refractive material 6 of the chopper 4. This frame is read and scanned in the same way as the previous frame, but due to successive facets of the polygon 37 being cut in different directions, successive reflective images are displaced by an equal and opposite amount to that which they are displaced due to refraction by chopper 4. Therefore the eye of the observer, due to persistence of vision, not only generates two dimensional images, but interleaves successive images thereby producing a composite microscanned image.

What we claim is:

1. An imager comprising: a lens for focusing received radiation onto a two dimensional array of sensor elements; mechanical means for displacing an image incident on the array of sensor elements relative to the array to effect microscan; an array of optical elements which generate an output in dependence upon radiation incident on the sensor array; and means for variably deflecting radiation from the optical elements, in synchronisation with the means for effecting microscan.

2. An imager as claimed in claim 1 wherein the radiation from the optical elements is deflected in opposite sense, and in proportion to the displacement of the image on the sensor elements.

3. An imager as claimed in claim 2 wherein the radiation is variable deflected to produce an image which is a combination of successive microscanned frames.

4. An imager as claimed in claim 1 wherein the optical elements are arranged in a one dimensional array which generates a sequential optical output in dependence upon the radiation received by each sub array of the sensor array.

5. An imager as claimed in claim 4 wherein the variably deflecting means comprises a polygon having reflective facets arranged to rotate about a central axis such that sequential optical outputs from the optical elements are scanned by the polygon.

6. An imager as claimed in claim 5 wherein the facets of the polygon are profiled to produce a displacement of sequential images generated by scanning the optical array, the displacement being in the opposite sense to the displacement due to microscanning prior to incidence on the sensor array.

7. An imager as claimed in claim 1 wherein the mechanical means for displacing an image, and means for deflecting radiation from the optical generating means are mechanically coupled.

8. An imager as claimed in claim 1 wherein the mechanical means for displacing an image comprises a member including at least one refractive region transmissive to radiation to which the sensor elements are responsive and is movable such that a refractive region of the member is repeatedly interposed in the radiation path between the lens and the array, whereby the image focused on the array is moved.

9. An imager as claimed in claim 8 wherein the member includes at least one region which is substantially non-transmissive to said radiation which is interposable in the radiation path.

10. An imager as claimed in claim 9 wherein the member comprises a plurality of said refractive regions arranged alternately with a plurality of said non-transmissive regions, such that in operation movement of the member causes different transmissive regions to be interposed in turn in said radiation path whereby the image focused on the array is sequentially moved in different directions relative to the array.

11. An imager as claimed in claim 9 wherein each transmissive and non-transmissive region has nominally substantially identical dimensions.

12. An imager as claimed in claim 8 wherein the member is substantially planer and is rotatable about an axis at a constant angular velocity.

13. An imager as claimed in claim 10 wherein successive transmissive regions comprising refractive material, refract radiation in opposite directions.

14. An imager as claimed in claim 8 wherein the refractive material refracts radiation such that an image focused on the sensor elements by the lens is refracted by a distance less than the distance between centres of adjacent sensor elements.

15. An imager as claimed in claim for imaging thermal radiation.

16. An imager as claimed in claim 15 wherein the sensor elements are pyroelectric elements.

17. An imager as claimed in claim 1 wherein the radiation is sequentially displaced in four orthogonal directions.

18. An imager as claimed in claim 1 wherein the mechanical means for displacing an image is a disc and comprises a plurality of transmissive refractive regions arranged alternately with non transmissive regions around its periphery, the boundary between adjacent regions being curved such that the said boundary passes over the array with a substantially constant linear velocity.

19. An imager as claimed in claim 18 wherein the mechanical means comprises eight transmissive refractive regions interposed between eight non transmissive regions, each successive refractive region refracting radiation in a direction at 90° to the previous region.

* * * * *